United States Patent [19]

Gross

[11] 4,109,833

[45] Aug. 29, 1978

[54] PISTON FOR PRESSURE DISPENSERS OF THE BARRIER PISTON TYPE

[76] Inventor: Jerome A. Gross, 6304 S. Rosebury, St. Louis County, Mo. 63105

[21] Appl. No.: 751,396

[22] Filed: Dec. 17, 1976

[51] Int. Cl.² ............................................. B67D 5/54
[52] U.S. Cl. ................................. 222/386.5; 222/389
[58] Field of Search ...................... 222/386.5, 389, 386

[56] References Cited

U.S. PATENT DOCUMENTS

| 3,273,762 | 9/1966 | O'Neill | 222/389 |
| 3,381,863 | 5/1968 | Towns | 222/386.5 |
| 4,023,717 | 5/1977 | Schultz | 222/386.5 |

Primary Examiner—Robert B. Reeves
Assistant Examiner—Frederick R. Handren

[57] ABSTRACT

For pressure dispensers of the barrier piston type, the present piston includes circumferential ribs and adjacent grooves. The grooves so reduce the bending resistance of the piston wall as to hinge inward, to slope the ribs downward. When pressure is applied within the piston, this bends the rib against the interior can wall like a squeegee. As the piston rises in the can, the rib flexes to take up surface irregularities.

A plurality of these elements makes the piston wall flexible, permitting segments above and below each to deflect sideward. This flexibility to adapt to the cross-section of somewhat out-of-round cans adds reliability to the barrier piston pack system.

2 Claims, 10 Drawing Figures

U.S. Patent  Aug. 29, 1978  4,109,833
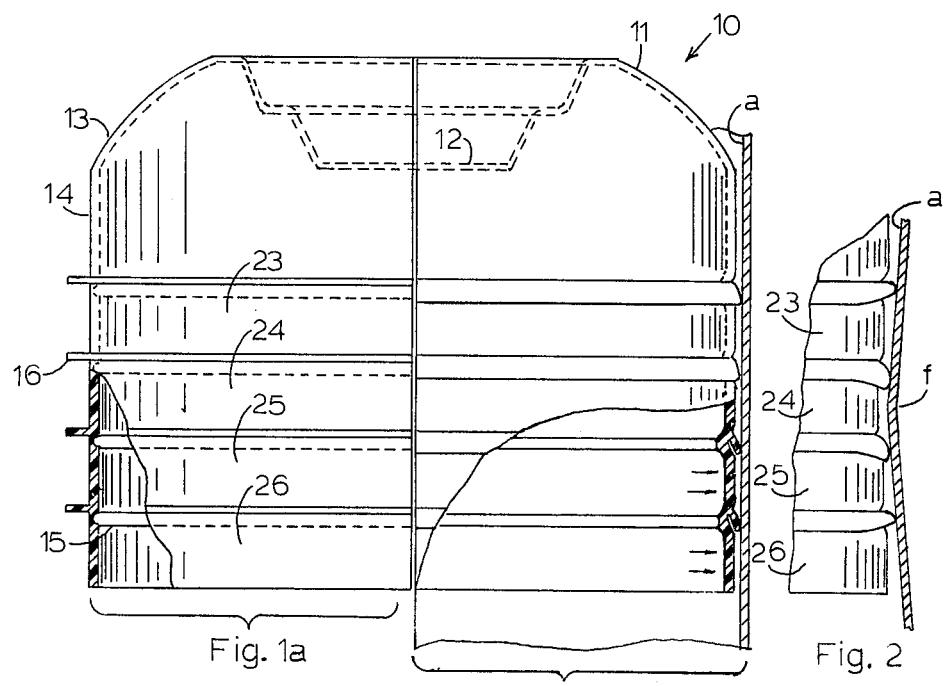
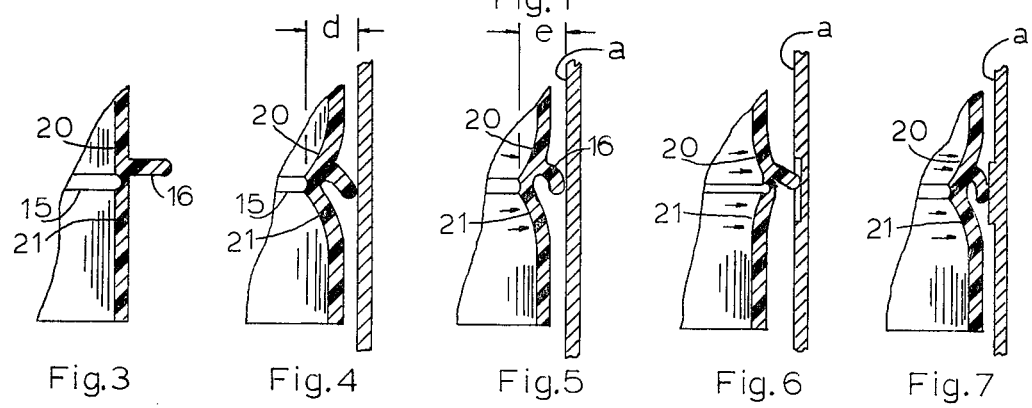
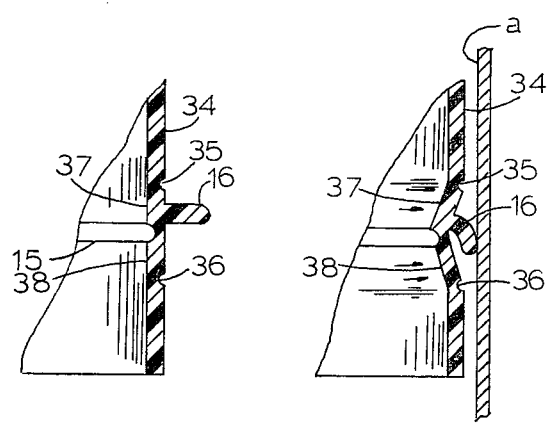

PISTON FOR PRESSURE DISPENSERS OF THE BARRIER PISTON TYPE

BACKGROUND OF THE INVENTION

Viscous food products such as cake decorations and soft cheese are presently packed in valved pressure dispensing cans on top of barrier pistons, which separate the product from a pressurizing gas beneath the piston. Some such cans have side seams which present inner surface irregularities; even unseamed cans may be bent slightly out-of-round. The cylindrical wall pistons heretofore in use, molded of a flexible plastic such as polyethylene, do not yield sufficiently to make up for such can irregularities; though molded with projecting circumferential rubbing beads.

SUMMARY OF THE INVENTION

The present invention utilizes the combination of circumferential ribs, molded to a diameter larger than the inner diameter of the can to be used, and adjacent grooves which in effect hinge to bend adjacent wall segments inward. Between two perimetric segments a circumferential hinge groove is formed in the piston wall, preferably on its inner side, immediately below each projecting rib, which is molded to project perpendicularly on the upper segment immediately adjacent to the groove. The groove is formed to such depth — say approximately half the thickness of the piston wall — that the greater part of the wall bending stiffness is overcome; since the material remaining ties the upper and lower perimetric segments together, the groove is referred to as a hinging groove. When the piston is inserted in the can with its circumferential ribs bearing against the inner can wall, the inward forces on the ribs transmitted deflect the wall segments inward to a maximum depth at the groove where they join at an appreciable bend angle, like at a hinge. Adjacent to the groove each of the perimetric segments slopes inward toward it.

Since the rib projects perpendicular to the upper perimetric segment and is adjacent to the groove, the slope at the level at which the upper segment is then bent deflects the rib downward to a somewhat conical orientation. Then, when gas pressure is applied within the piston, it presses outwardly against the resistance of the now sloping rib, causing it to bend further downward. In this position it is pressed elastically against the can wall, and edge portions of it adapt their flexure to irregularities within the can inner surface.

The inward bending of these elements is in part analogous to the wall of an accordian or bellows. By using the plurality of such elements spaced axially along the height of the piston, its transverse shear rigidity is greatly reduced. Adjacent segments can shift laterally from each other; this permits the ribs to fit better into out-of-round portions of the can as may be due to malformation or bending in handling.

BRIEF DESCRIPTION OF THE DRAWINGS

FIG. 1 is an enlarged view, partly in section, of a barrier pack piston embodying the present invention. The left half thereof designated FIG. 1a shows the new piston prior to insertion in a dispensing can and the right half designated FIG. 1b after being so inserted into such can and pressurizing gas inserted.

FIG. 2 is a fragmentary view of the left side of FIG. 1b showing the present barrier pack piston in a can having a somewhat bent side wall.

FIG. 3 is a further enlarged fragmentary sectional view of one of the sealing provisions of FIG. 1, shown prior to insertion into such can.

FIG. 4 is a view similar to FIG. 2 after insertion into the can and prior to gassing.

FIG. 5 is a similar view after gassing.

FIG. 6 is a similar view showing the extension of the present sealing provisions to fit into a low spot of the wall of a seamed can.

FIG. 7 is a view similar to FIG. 6, showing the inward deflection of the present sealing provisions, to seal against a high spot in the seam of such can.

FIG. 8 is a view similar to FIG. 2 of an alternative embodiment of the invention.

FIG. 9 is a view of said alternative embodiment after insertion and subsequent to gassing.

DESCRIPTION OF THE PREFERRED EMBODIMENT

A barrier pack piston incorporating the present invention generally designated 10 in FIG. 1, is molded of relatively flexible polyethelene or similar plastic material to generally inverted cup-like configuration shown. It includes an imperforate top wall portion 11 having a small downward domed portion 12 to fit close to a conventional dispensing valve, as heretofore used in barrier pack dispensing containers. It further has a shoulder portion 13 and a generally cylindrical wall 14 which continues downward to its lower edge, leaving the piston hollow, to receive pressurized gas in the conventional manner. The diameter of the cylindrical wall portion 14 is sufficiently smaller than the diameter of the generally cylindrical interior wall surface $a$ of the dispensing can in which the piston 10 is to be used as to permit sliding therein despite wall irregularities, as typically found in dispensing cans whose side wall has a seam formed by tabs. Such irregularities may be as schematically shown in FIGS. 6 and 7, which illustrate high and low surface portions.

In order to seal reliably in spite of such inner surface irregularities, whether due to seams or out-of-round condition, the present invention provides a unique interacting combination of circumferential sealing provisions. Referring to FIGS. 1-4, each of the said provisions has a circumferential groove 15, shown as formed approximately half way through the thickness of the wall 14, which takes away the greater part of its bending stiffness and it hence referred to as a substantially hinging groove. Molded on the outer wall, to project perpendicularly to a diameter which slightly exceeds that of the normal inner diameter of the can wall $a$, is a circumferential wiping rib 16. Wall portions immediately adjacent to the groove 15 are referred to as the upper perimetric portion 20 and the lower perimetric portion 21; as seen in FIG. 3 these portions 20, 21 flex inwardly to the hinging groove 15 when the rib 16 comes into contact with the inner can wall $a$. The groove 15 itself deflects inward the distance $d$ shown in FIG. 4.

By analogy to the deflection of two cantilever beams connected by a hinge, the perimetric portions 20, 21, when so pressed inward, bend to a slope increasingly away from their vertical alignment to what is nearly an angle at the hinging groove 15. Since the rib 16 is molded closely adjacent to the groove 15, to project perpendicular to the undeflected wall as in FIG. 2, when the portion of the upper perimetric portion 20 slopes downward and inward, the rib 16 cants slantingly downward and outward, taking the shape of part of the wall of a cone.

Thereafter, after the can is filled with a viscous product to be depressed and gas pressure is applied to the can beneath the piston 10, the perimetric portions 20, 21 are pressed somewhat outward as indicated in FIG. 5, the original inward deflection $d$ of the groove 15 being lessened to the smaller deflection $e$ shown in FIG. 5. The wiping rib 16 accommodates itself to this outward pressure and movement flexing roundedly downward as shown in FIG. 5.

When the interior surface of the can $a$ is not perfectly cylindrical, the present sealing provisions adapt to the irregularities presented. For example, the can $a$ may be of the seamed type having overlapping tabs which present high and low areas or spots on the can interior. FIG. 6 shows how not only the rib 16 but the perimetric portions 20, 21 deflect outward, relative to the FIG. 5 position, when encountering such a low spot. Similarly FIG. 7 shows how, when encountering a high spot, these provisions deflected farther inward than shown in FIG. 5. In both of these, the accommodations to the wall irregularities may be accompanied by a change in the hinge positions of the upper and lower perimetric portions 20, 21, as well as by the more obvious change in downward deflection of the rib 16.

A plurality of such sealing ribs 16 and hinge grooves 15 (with their adjacent perimetric segments 20, 21) are provided on the piston wall 14, spaced axially from each other and dividing it into segments 23, 24, 25, 26. The flexure of the perimetric portions 20, 21 moves the segments 23, 24, 25, 26 laterally relative to each other to the staggered alignment shown in FIG. 2, when the piston passes within a section of the can wall $a$ which may have been bent out-of-round. Thus, when the can wall $a$ has a slight inward bend $f$, as shown in FIG. 2, these segments will be displaced with freedom somewhat analogous to that of the adjacent sections of the wall of a bellows or accordian.

While the walls 14 of conventional barrier pack pistons are sufficiently flexible to bend in the manner shown in FIGS. 4 and 5 when provided with the hinging grooves 15 and adjacent ribs 16 described, should their bending stiffness be greater (for example, by reason of greater wall thicknes or greater rigidity of the material used), similar slope of the portions adjacent to the hinging groove 15 may be achieved by the use of supplemental grooves which bound the perimetric segments. Thus in FIG. 8, a similar hinging groove 15 and external rib 16 are provided, molded as part of the wall 34 in the same manner as in the preceding embodiment. However, here an upper perimetric portion 37 and a lower perimetric portion 38 are bounded, remote from the hinging groove 15, by upper and lower slope-facilitating boundary grooves 35, 36, shown formed into the outer side of the wall 34. When a piston with sealing provisions so formed is inserted within the can $a$, the slope facilitating grooves 35, 36, although illustrated as not as deep as the hinging groove $g$, so reduced the bending stiffness of the wall 34 as to serve as partial hinges, so that the perimetric segments 37, 38 substantially fold inwardly under the thrust of the rib 16 against the inner container wall $a$. The configuration assumed, after gas pressure within the piston presses outward, is as shown in FIG. 9, this is to be quite similar to that of FIG. 5 except for the more abrupt change in slope at the boundary grooves 35, 36. This embodiment of invention thus acts, like that of the first described embodiment, to adapt to can wall irregularities and out-of-round conditions.

Considering that the grooves 15, 35, 36 function to reduce the bending stiffness of the wall 14, permitting a movement closer to folding than classical bending, their location, whether on the outer or inner side of the piston wall 14, is in part a manner of engineering choice, depending for example on tooling considerations. The precise depth of the groove may be determined by trial and error, as functions of clearances to be used and gas pressure employed. The grooves somewhat interfere with inflow of plastic; but not so much as if long thin sections were used, rather than the narrow grooves.

A squeegee-like wiping accompanies upward movement of the piston as the product packed in the dispenser is dispensed. This wiping action follows from the initial nearly conical downward and outward slope of the rib 16, thereafter held bent backward from the line of travel of the piston by the pressure within the can itself, together with the varying inward displacement of each hinge line 15 inserted by the gas pressure. It follows also from the relatively free lateral displacement of the wall segments 23, 24, 25, 26 relative to each other. The resultant superior sealing makes it possible to use advantageously and reliably the less expensive cans having brazed tabs which provide alternate high and low spots in the can interior, and also permits the use of thinner wall cans more likely to be distorted in use; also it permits use of the barrier piston dispensing system with products of lesser viscosity.

A somewhat similar piston might be constructed with hinging grooves and perimetral segments thereadjacent intended to flex primarily outward from the cylindrical wall 14, rather than inward. In such a piston, the circumferential rib would be molded to a diameter slightly smaller than that of the can interior, just below the hinging grooves; and both the ribs and the grooves would have to stretch under the pressure of the gas, to increase their perimetric length. This is not considered as advantageous as the construction illustrated, in which the outer edge of the ribs 16 bends readily downward. Also the thin wall at the hinge groove 15, when displaced inward, offers little resistance because the flexible material will warp readily and without much resistance. Other variations in details of construction and modifications to suit special purposes will suggest themselves to persons having skill in the art.

I claim:

1. For use in a pressure dispensing can of generally cylindrical cross-section,
   a barrier pack piston, comprising
   an inverted cup-like shell molded of a bendable plastic and having an imperforate top portion and a generally cylindrical wall of generally constant thickness joining the top portion, the diameter of the outer surface of said cylindrical wall being sufficiently smaller in diameter than the interior diameter of such can to permit sliding therein, said wall having spaced between its top and bottom extremities
   a circumferential sealing provision comprising
   a circumferential groove defining a hinge line,
   constant thickness perimetrical portions of said wall above and below said groove and there adjoining each other, and a circumferential wiping rib molded to project perpendicularly from the outer surface of the upper of said perimetrical portions immediately adjacent to said groove to a diameter which exceeds that of the interior of such can, whereby when the piston is in place within such can the wiping rib is pressed inward by its contact with the inner can wall, causing said perimetrical portions to deflect inward at said groove, the said upper perimetrical portion adjacent said hinge line thereby assuming an inward and downward slope and thus positioning the wiping rib slopingly outward and downward.

2. A barrier pack piston as defined in claim 1, wherein at least one of said perimetrical portions is bounded, remote from said hinge groove, by a slope facilitating boundary groove, whereby, when inward pressure of the interior can wall deflects the wiping groove inward, to facilitate substantially conical slope of the said perimetrical portion inwardly toward said hinging groove.

* * * * *